United States Patent
Zhong et al.

(10) Patent No.: US 10,200,650 B2
(45) Date of Patent: Feb. 5, 2019

(54) PLUG-IN TELEVISION

(71) Applicant: AMLOGIC (SHANGHAI) CO., LTD., Pudong Shanghai (CN)

(72) Inventors: John Zhong, Pudong Shanghai (CN); Mike Yip, Pudong Shanghai (CN); Kevin Chen, Pudong Shanghai (CN); Robin Zhu, Pudong Shanghai (CN)

(73) Assignee: AMLOGIC (SHANGHAI) CO., LTD., Pudong Shanghai (CN)

( * ) Notice: Subject to any disclaimer, the term of this patent is extended or adjusted under 35 U.S.C. 154(b) by 0 days.

(21) Appl. No.: 15/321,539

(22) PCT Filed: Oct. 27, 2015

(86) PCT No.: PCT/CN2015/092901
§ 371 (c)(1),
(2) Date: Dec. 22, 2016

(87) PCT Pub. No.: WO2016/070734
PCT Pub. Date: May 12, 2016

(65) Prior Publication Data
US 2017/0244925 A1 Aug. 24, 2017

Related U.S. Application Data

(60) Provisional application No. 62/077,236, filed on Nov. 18, 2014.

(30) Foreign Application Priority Data

Mar. 25, 2015 (CN) .......................... 2015 1 0134330

(51) Int. Cl.
H04N 21/41 (2011.01)
H04N 21/4363 (2011.01)
(Continued)

(52) U.S. Cl.
CPC ....... *H04N 7/0125* (2013.01); *G06F 13/4081* (2013.01); *H01R 24/64* (2013.01);
(Continued)

(58) Field of Classification Search
CPC .. H04N 5/64; H04N 5/38; H04N 5/63; H04N 7/01; H04N 5/4403; H04N 21/4122;
(Continued)

(56) References Cited

U.S. PATENT DOCUMENTS

2003/0076346 A1   4/2003  Yun
2010/0169940 A1*  7/2010  Howarter ................. H04B 3/54
                                                   725/80

(Continued)

FOREIGN PATENT DOCUMENTS

CN   2893784     4/2007
CN   202150899   2/2012
CN   104767950   7/2015

OTHER PUBLICATIONS

Patent Cooperation Treaty International Searh Report & Written Opinion (Translations); dated Jan. 15, 2016 (Enclosed herein).

*Primary Examiner* — Benjamin R Bruckart
*Assistant Examiner* — Aklil M Tesfaye
(74) *Attorney, Agent, or Firm* — The Myers Law Group

(57) ABSTRACT

The plug-in television provided by this invention integrates the master control module of the television into a plug card and separately configures the plug card and the display, and the display is mainly used to play and control the audio and video data, and the plug card is mainly used to receive and process the audio and video data; since the plug card and the display are separately configured in physical structure, it allows users to carry out the operations like repairing, maintenance, upgrading and replacement on them separately; moreover, since the display is the main structure of (Continued)

the television, and the plug card is plugged into the slot provided on the display to form the television, the problem in the current television field that the upgrading speed of the screen terminal device is exceedingly unmatched with the upgrading speed of the master control device is effectively solved.

7 Claims, 3 Drawing Sheets

(51) Int. Cl.
| | |
|---|---|
| H04N 21/426 | (2011.01) |
| H04N 21/61 | (2011.01) |
| H04N 7/01 | (2006.01) |
| H04N 5/64 | (2006.01) |
| H04N 5/44 | (2011.01) |
| H04N 5/46 | (2006.01) |
| H04N 5/60 | (2006.01) |
| H04N 5/63 | (2006.01) |
| G06F 13/40 | (2006.01) |
| H04N 5/38 | (2006.01) |
| H01R 24/64 | (2011.01) |
| H01R 27/02 | (2006.01) |
| H01R 107/00 | (2006.01) |

(52) U.S. Cl.
CPC ............... *H01R 27/02* (2013.01); *H04N 5/38* (2013.01); *H04N 5/4401* (2013.01); *H04N 5/4403* (2013.01); *H04N 5/46* (2013.01); *H04N 5/60* (2013.01); *H04N 5/63* (2013.01); *H04N 5/64* (2013.01); *H04N 7/01* (2013.01); *H04N 21/4122* (2013.01); *H04N 21/426* (2013.01); *H04N 21/43635* (2013.01); *H04N 21/6125* (2013.01); *H01R 2107/00* (2013.01); *H01R 2201/18* (2013.01); *H04N 2005/4412* (2013.01); *H04N 2005/4414* (2013.01)

(58) Field of Classification Search
CPC ........... H04N 21/43635; H04N 21/426; H04N 21/6125; G06F 13/4081
See application file for complete search history.

(56) References Cited

U.S. PATENT DOCUMENTS

| | | | |
|---|---|---|---|
| 2011/0216245 A1* | 9/2011 | Kyriazis | H04N 5/38 348/723 |
| 2013/0111533 A1* | 5/2013 | Klarke | G06F 1/263 725/109 |
| 2014/0049693 A1* | 2/2014 | Selim | G06F 3/017 348/570 |
| 2015/0062426 A1* | 3/2015 | Lu | H04N 5/775 348/441 |

* cited by examiner

PLUG-IN TELEVISION

CROSS-REFERENCE TO RELATED APPLICATIONS

The present application claims priority to and the benefit of Chinese Patent Application No. CN 201510134330.4, filed on Mar. 25, 2015, and of U.S. Provisional Patent Application No. 62/007,236, filed on Nov. 8, 2014, the entire content of which is incorporated herein by reference.

BACKGROUND OF THE INVENTION

1. Field of the Invention

The present invention relates to the field of television, and more particularly, to a plug-in television.

2. Description of the Related Art

In the process of the development of modern society, as an important medium for people to obtain audio and video information, television has been constantly developed with advances in technology, especially with the ever-changing internet technology; the smart television obtains more and more people's attention as the core device of smart home.

At present, televisions are all-in-one machines in the market, which is that devices like the screen terminal for display and the main module for control are integrated as a whole for design, production and sale; the service life of the television is long (at least 4 to 5 years, or even 10 years), yet with the advances of technology, the main module is updated faster and the screen terminal device is updated slower, which results mismatch between the devices of the television as an all-in-one machine, so users can only purchase the whole machine when upgrading, thereby it greatly increases the upgrading cost, and hinders the upgrading process of the core module of televisions.

In addition, with the advances in technology, functions realized and integrated in televisions are more and more, which shows a diversified development trend; manufacturers integrate many functional modules in televisions to meet different users' demands as much as possible; however with the diversified development of society, individuation of user demands is growing, thereby causes televisions produced by manufacturers cannot meet the different demands of different users, and makes the television purchased by users be attached many useless functions as for itself, thereby results in a waste of resources.

SUMMARY OF THE INVENTION

In view of the above-mentioned technical issues, the present application provides a plug-in television, comprising:

a display, configured with a slot;

a plug card, plugged into the slot to connect to the display;

wherein the plug card is connect to a signal transmission device of the plug-in television through the display, to receive first data transmitted through the signal transmission device, and, after processing the first data, to convert the processed first data into second data; the display receives the second data, and plays audio and video signals contained in the second data.

As a preferable embodiment, in the plug-in television, the audio and video signal comprises audio data and/or video data; the display comprises:

a bridge chip, receiving the second data and after processing the second data, outputting the audio data and/or the video data for playing.

As a preferable embodiment, in the plug-in television, the display further comprises:

a display device, connected to the bridge chip to receive and play the video data;

a power adapter, connected to the plug card to drive the plug card.

As a preferable embodiment, in the plug-in television, the display further comprises:

an audio device, connected to the bridge chip to receive and play the audio data.

As a preferable embodiment, in the plug-in television, the display is further comprises:

a plurality of peripheral devices, connected to the bridge chip to adjust operating parameters of the audio device and the display device, and receive remote-control signals transmitted through a remote control matching the plug-in television.

As a preferable embodiment, in the plug-in television, the plurality of peripheral devices comprise:

physical buttons, connected to the bridge chip to adjust the operating parameters of the audio device and the display device;

a remote-control signal receiving device, connected to the bridge chip to receive the remote-control signals, so as to control the playing of the audio data and/or the video data.

As a preferable embodiment, in the plug-in television, the plug card comprises:

at least one subunit, and each of the subunits being connected to the matching signal transmission device;

a core unit, and each of the subunits being connected to the display through the core unit;

wherein any one of the subunits receives the first data from the matching signal transmission device, and converts the first data into unprocessed data in a standard format to the core unit, and the core unit processes and converts the unprocessed data in the standard format into the second data.

As a preferable embodiment, in the plug-in television, the subunits comprise:

a wireless television signal processing subunit, configured to receive and process wireless television signal transmitted through wireless broadcasting, and to convert a format of the wireless television signal into the standard format;

a closed circuit television signal processing subunit, configured to receive and process closed circuit television signal transmitted through wire transmission, and to convert a format of the closed circuit television signal into the standard format;

an internet television signal processing subunit, configured to receive and process internet television signal transmitted through Internet, and converting a format of the internet television signal into the standard format.

As a preferable embodiment, in the plug-in television, the plug card further comprises:

a local storage device connected to the core unit;

wherein the core unit can call and transmit the audio and video data stored in the local storage device to the display for playing.

As a preferable embodiment, in the plug-in television, the subunits further comprise:

an audio and video input device, configured to receive audio and video data transmitted through an external audio and video output device, and, after processing the audio and video data, transmitting the processed audio and video data to the display (the screen terminal device) for playing.

As a preferable embodiment, in the plug-in television:

the audio and video input device stores the processed audio and video data into the local storage device.

As a preferable embodiment, in the plug-in television, the subunits further comprise:

a wireless communication device, configured to receive and transmit network audio and video data to the core unit for processing, and the core unit transmits the processed network audio and video data to the display for playing.

As a preferable embodiment, in the plug-in television:

each of the subunits and/or the core unit is separately integrated into a single structure, configured to be separately upgraded and/or replaced.

As a preferable embodiment, in the plug-in television:

the display exchanges data with the plug card through preset plug pins.

The above technical solution has the following advantages or beneficial effects:

The technical solution of the present invention integrates the master control module of the television into a plug card, which is separately configured from the display, and the display is mainly used to play the audio and video data, while the plug card is mainly used to receive and process the audio and video data; the plug card and the display are separately configured in the physical structure, thus it allows users to carry out the operations like repair, maintenance, upgrading and replacement on them separately; at the same time, since the display is the main structure of the television, and the plug card is plugged into the slot correspondingly configured on the display to form the television, so as to effectively solve the problem in the field of current television in which the upgrading speed of the screen terminal device is exceedingly unmatched with the upgrading speed of the master control device, i.e., users can easily achieve the maintenance and upgrade of the television by replacing or upgrading the plug card; in addition, the plug-in television disclosed in the present application can upgrade each separate unit according to individual demands, thus it effectively reduces the upgrading cost of the television.

BRIEF DESCRIPTIONS OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
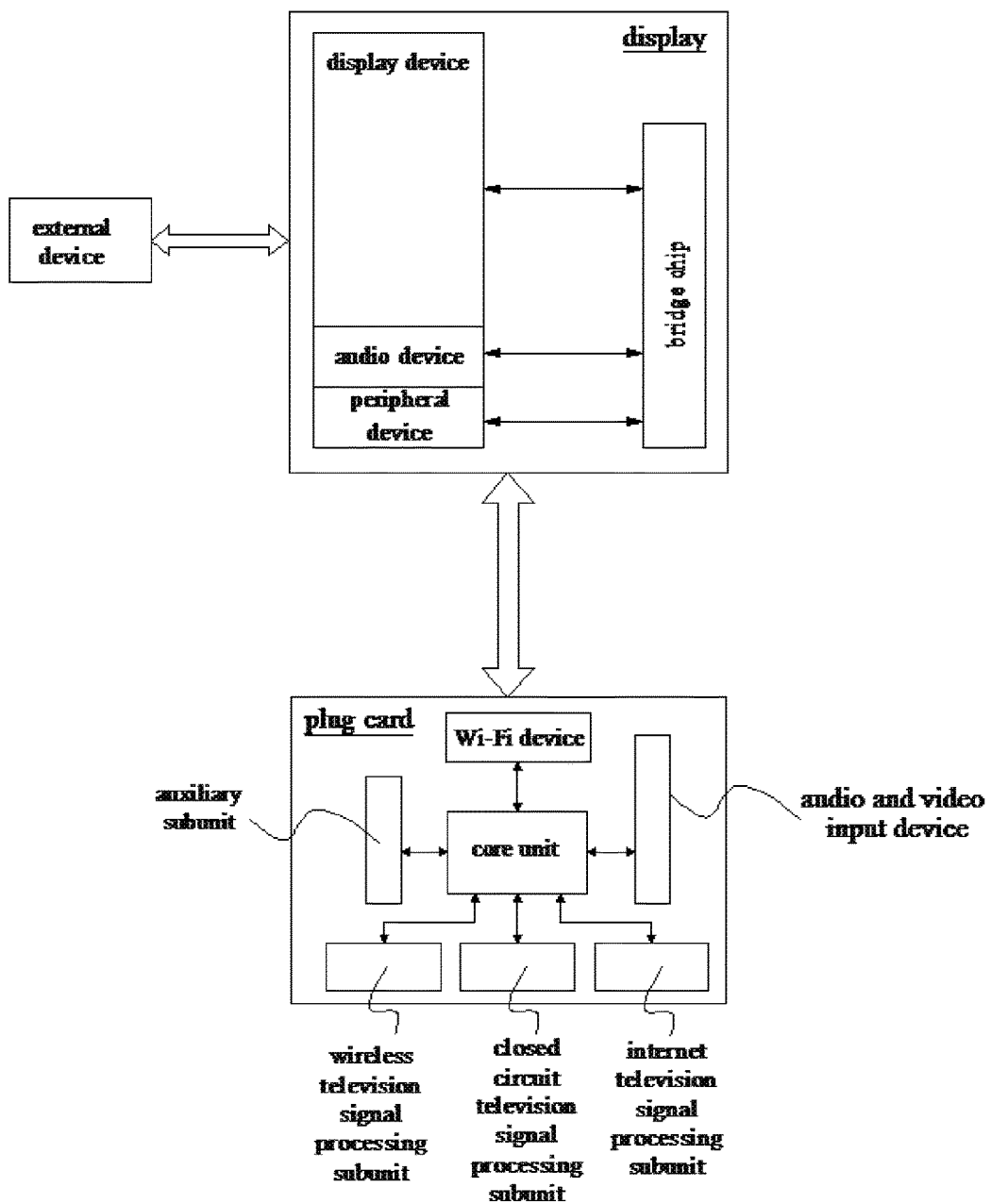
FIG. 1 is a structure diagram of the plug-in television in the embodiment 1 of the present application.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

The plug-in television provided in the embodiment of the present invention integrates the core components in the television stricture into a single independent plug card (i.e., the master control module) based on the prior television structure, and also the independent plug card can be made up of indispensable core modules in the television and at least one independently configured subunit with an independent function, and the screen terminal components used for playing audio and video are integrated as an another separate display; since the upgrading speed of the components in the display is slower, and the upgrading speed of the components in the core module is faster, therefore when upgrade the television, users can only separately upgrade the core components need to be upgraded and keep the components, which does not need to be upgraded, such as the screen terminal components etc., therefore it effectively reduces the upgrading cost of the television; moreover, users can configure the required subunits with independent functions with the core module to form the plug card having special functions according to individual needs when purchasing a new television, thus it makes the purchased television meet individual needs.

The contents below describe the plug-in television of the present invention in detail combined with the accompanying drawings and specific embodiments.

Embodiment 1

FIG. 1 is a structure diagram of the plug-in television in the embodiment of the present application; as shown in FIG. 1, the plug-in television of the embodiment comprises:

a plug card, assembled mainly by the core components of the television; for example, the core components may comprise input devices (such as HDMI/CVBS, etc.) related to the playing contents of the television, and the master control chip storing relevant information of the online video data, the application data and the game data, etc; the plug card is connected to the signal transmission device of the plug-in television through the connection ports configured on the display, so as to receive the original data (the first data) transmitted through the signal transmission device, and, after processing the original data, convert the processed data into playing data (the second data) matching the display.

Preferably, the plug card can be made up of an indispensable core unit in the television, for example, assembled by the master control chip and so on, and at least one subunit, and each subunit can separately realize a processing function for data in at least one format (such as wireless television data, closed circuit television data, internet signals, etc.); and when the above mentioned plug-in television is assembled with any subunit, each of the subunits is connected to the signal transmission device matching with it respectively, to receive the original data in corresponding format, and converts the original data into an unprocessed data in a standard format, for the subsequent procession of the data by the core unit such as converting etc., and than converting the data into the playing data.

Preferably, any one of the above mentioned subunits can be separately configured together with the core unit to form the plug card which can be normally operated, so as to realize receiving and playing a type of television signal through the display; of course, two or more subunits can be mixed to realize receiving and playing two or more types of television signal.

Preferably, the above mentioned subunits may comprise a wireless television signal processing subunit, a closed circuit television signal processing subunit and an internet television signal processing subunit; the wireless television signal processing subunit is mainly used for receiving and processing wireless television signal transmitted through wireless broadcasting, and converting the format of the wireless television signals into the standard format, for the subsequent processes by the core unit; the wireless television signal processing subunit may receive and process wireless television signals through wireless broadcasting, which correspondingly need to be integrated with components like the receiving antenna for wireless signals and the audio and video converter, and can independently complete operations like receiving, analyzing and converting the wireless television signal data; the closed circuit television signal processing subunit is used for receiving and processing closed circuit television signal (such as the digital television signal) transmitted through wire transmission, and converts the format of the closed circuit television signals into the standard format; the closed circuit television signal processing subunit may receive and process television signal through wires, which correspondingly need to be integrated with components like the receiving device for closed circuit television signal and the audio and video converter, and can independently complete operations like receiving/transmitting, analyzing and converting the closed circuit television signal data; the internet television signal processing subunit is used for receiving and processing internet television signals (such as the online audio and video data, the game data and the application data, etc) transmitted through Internet, and converts the format of the internet television signals into the standard format; the internet television signal processing subunit may receive and process television signal through Internet, which correspondingly needs to be integrated with components like the receiving device for internet television signal and the audio and video converter, and can independently complete operations like receiving/transmitting, analyzing and converting the internet television signal data.

It should be noticed that any one of the above subunits is mainly adapted to separately receive, analyze and convert the television signals when transmitting the television signal in different ways, so as to convert the original television data into the data, which is to be processed, in a unified standard format for the subsequent processes by the core unit; at the same time, each subunit may have components for data exchanging according to actual needs, so as to achieve exchange with the television signals (such as the internet television signal) in the matching format.

Preferably, the core module may also be configured with, such as, an audio and video input device for receiving audio and video data transmitted through an external audio and video output device, and internet access devices (such as a Wi-Fi device for providing wireless communication signals and/or an Ethernet device for providing wire communication signals and so on) for providing internet communication signals an so on, which allows the plug-in television of the embodiment can be integrated into the rapidly developed Internet of Things interconnected with the smart home.

Preferably, the audio and video input device is mainly used to receive and process the audio and video data, and transmit the processed audio and video data to the display for playing; at the same time, the audio and video input device stores the processed audio and video data into the local storage device for data backup or call of using; accordingly, the local storage device would have a larger storage capacity, or regularly clear data before a preset period of time by setting a storage algorithm, to reserve enough storage space for storing the processed audio and video data.

Further, the core module may also comprise a number of auxiliary subunits which can be independently operated or separately upgraded, and is made up of components that can separately achieve a certain function, as long as each of them can be replaced and upgraded separately.

Meanwhile, the core unit (comprising the master control chip, etc.) can be used for processing different television signal data, and authenticating, controlling and power supplying each subunit; as the core component of the television, it can also be upgraded and replaced separately; i.e., the plug card is assembled by a plurality of separate unit modules, and can be replaced or upgraded as a whole, and also each unit can be replaced or upgraded as a separate component, thus it allows users to assemble different subunits with the core unit to form the core module meeting their individual needs when purchasing the television; and in the subsequent using process, different needs of users at different stages can be met by changing, upgrading or adding the corresponding subunits.

It should be noticed that the above mentioned core module certainly comprises the core unit and at least one subunit, and as long as the core module comprise the core unit and a subunit, the core module can realize receiving, analyzing and conversing the television signals in the matching format of the subunit, and also by adding any one or more subunits and/or auxiliary subunits, the core module can have the function corresponding to the added units.

Further, the plug-in television also comprises a display, and the display is in communication connection with the core module through an external cable (such as preset integrated bus, etc.) or wireless communication; in the present embodiment, the display is configured with a slot, and the plug card is plugged into the slot to achieve receiving and playing audio and video data transmitted through the core module; and also the display can feedback or transmit corresponding control instructions to the core module, so that users can carry out playing the plug-in television or human-computer interaction with the plug-in television; at the same time, the display is configured separately from the core module, so that they can be upgraded and/or replaced separately; and also a same display can simultaneously be connected to one or more core modules, a same core module can also be connected to one or more displays simultaneously, thereby achieving functions like multi-screen display or multi-screen interaction.

Preferably, the display may comprise one or more devices like a bridge chip, a display device (such as a liquid crystal display), an audio device (such as a sound) and peripheral devices (such as physical buttons and a remote signal receiving device), which are integrated into the display; i.e., the plug card can be just integrated with processing units for processing various functional modules, and the peripheral devices of various functional modules can be integrated into the display or be configured separately, as long as the bridge chip is in connection with the plug card and capable of receiving and processing audio and video data processed by the master control chip, and also transmits the audio data to the audio device for playing, and at the same time, transmits the video data to the display device for playing, and also synchronizes the playing progress of the display device and the audio device; the remote-control signal receiving and transmitting device is mainly used for receiving the control instructions transmitted through the remote control matching the plug-in television, and transmitting the control instructions to the master control chip, so as to make the master control chip control the operation of the display device and/or the audio device according to the control instructions.

Preferably, when the display device is a touch screen, the bridge chip may also transmit the touch instructions transmitted through the display device to the core unit of the plug card, so as to achieve the interaction operation between users and the television.

Preferably, users can adjust the features of the display device such as the contrast, the image quality and other parameters of the image display through the physical buttons.

Preferably, the plug card further comprises a local storage device that can be used to store the audio and video data downloaded by users and the parameter information of the television play; at the same time, the display may also comprise audio/video recording devices (such as a microphone, a camera and so on), users can record corresponding user audio/video data through the audio/video recording device, and store the audio/video data into the local storage device and/or into a remote server for sharing; meanwhile the plug-in television can also call and play the stored or shared audio/video data by other users.

Preferably, the display is also provided with a power adapter for driving normal operation of the plug card.

In the present embodiment, by separating the master chip and the display (i.e., configuring the master chip into the plug card) of the television, the television is upgraded through upgrading all or part of components of the plug card under the premise of without replacing the display, and thus it greatly reduces the upgrading cost of users.

The contents below describe the process from purchasing to upgrading/replacing the plug-in television in detail:

Firstly, a user can select a corresponding display according to their needs (such as size, quality, audio and video effects, etc.) when purchasing the television.

Secondly, the user select the core unit matching the display, and subunits and auxiliary subunits his/her need according to the selected display; and then assembles the selected core unit, the subunits and the auxiliary subunits into a plug card; for example, if the user only has needs on home digital television, the user can just select a core unit and a closed circuit television signal processing subunit and assemble the core unit and the closed circuit television signal processing subunit into a plug card, and this allows the user to just select corresponding functional subunits based only on specific needs when purchasing, thereby reducing the cost of purchase for users.

Thereafter, inset the plug card into the preset slot in the display, to form a television with functions the user needs, and then connect the television to the peripheral devices matching it, and play the television signals once power on.

Finally, in the process of subsequent use, the user can purchase a plug card meeting their new demands, and replaces with the purchased plug card into the display so as to meet their needs on the basis of the purchased plug-in television; of course, the user can also remove some subunits in the plug card of the purchased plug-in television according to needs, and when replacing, upgrading or repairing, the user can also separately upgrade, repair or replace a subunit, therefore it greatly reduces the subsequent upgrade and maintenance costs of the television.

At the same time, since each functional module in the plug card is separately integrated, the level of division of labor of manufacturers is improved, so as to reduce production costs through a separate batch mode, and promote the fast development of the entire industry; of course, based on the same concept, the display can also be configured in a similar structure.

In summary, the present embodiment configures the display separately from the plug card, to effectively reduce the upgrade difficulty of the television, meanwhile each functional module in the plug card is separately integrated into a whole, thereby the plug card and/or any of the functional modules can be separately replaced or upgraded, so that each functional module in the whole television structure can be separately upgraded or replaced, to effectively solve the problem of the upgrading mismatch between the components in the television structure, and reduce the upgrade and maintenance cost of the television; and the plug-in television described in the application can be assembled specifically according to personalized needs of different users, so as to effectively meet the personalized needs of different users.

Embodiment 2

Figure 2:
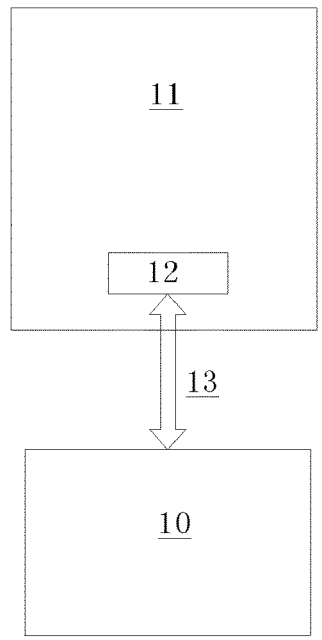
FIG. 2 is a structure diagram of the audio and video system in the embodiment 2 of the present application.

The present application also provides an audio and video system, based on the above-described embodiment 1, referring to FIG. 2, the audio and video system comprises a control block 10 (equivalent to the plug card in the embodiment 1) and a display panel 11, the display panel (equivalent to the display in the embodiment 1) 11 is also provided with an embedded bridge interface 12 and a bridge chip (not shown). The control block (equivalent to the plug card in the embodiment 1) 10 can be configured separately from the display panel 11 in the form of modular piece, and the control block 10 may have a plurality of form factors, and also be connected to the bridge interface 12 through one or more connectors 13, to transmit the audio and video data to the bridge chip and to control the display panel 11 for playing.

Figure 3:
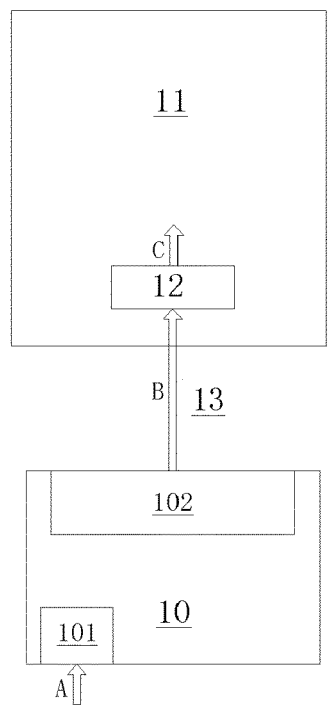
FIG. 3 is a structure diagram of the conversion of audio and video signals in the audio and video system in the embodiment 2 of the present application.

Preferably, the above mentioned control block 10 may comprise controls (not shown), related hardware 102 and inputs 101 of the television, as the control block 10 comprises video inputs and video processing hardware, refer to FIG. 3, the control block 10 transmits the video data to the bridge interface 12 through the connector 13, then bridge interface 12 transmits the received video data in a B-type format to the bridge chip, to convert the format of the video data in the B-type format into a displayable C-type format which can be displayed on the display panel 11, and then the converted video data is played through the display panel 11. Specifically, the control block 10 may comprise core modules of the television such as a central processing unit (CPU), a graphical processing unit (GPU), a television (TV) tuner, a power adapter for the control block and/or the display panel, high-definition-multimedia-interface (HDMI) inputs, Wi-Fi modules and/or Ethernet devices etc.

Figure 4:
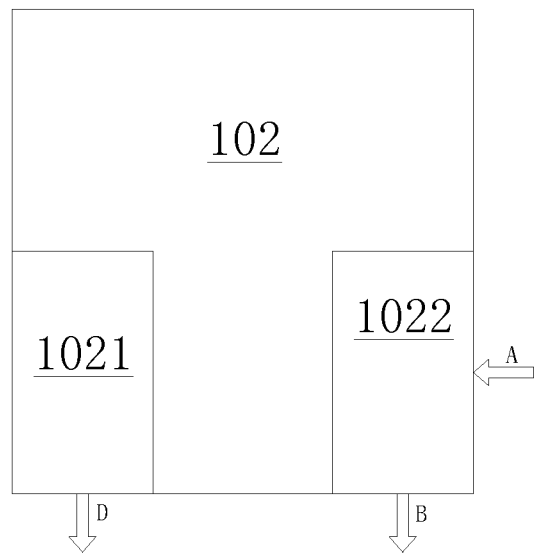
FIG. 4 is a structure diagram of the hardware devices in the audio and video system in the embodiment 2 of the present application.

Preferably; based on FIGS. 1-3, referring to FIG. 4, the video processing hardware 102 comprises a television tuner 1022, which is mainly used for processing the television signal A received by the control block 10, i.e., tuning the television signal A into the video data in B-type format, and outputting the processed television signal to the bridge interface 12 through one or more connectors 13.

Preferably, the control block 10 can be connected to the display panel 11 through a plurality of ways, for example: the control block 10 can be directly mounted onto the display panel 11, or connected a short distance away to the display panel 11 using one or more cables, or exchange data with the display panel 11 through a wireless connection.

Preferably, the bridge chip configured on the display panel 11 can adjust parameters of the display panel 11 independently, so that the same display panel 11 can match different control blocks 10 with different control modes, thereby facilitate the subsequent upgrade operation, and reduce the upgrade cost.

Currently, due to social and technological progress, on the consumer electronics market, core modules of smart TV based on SOC is normally upgraded every six months, yet TV panel technology progresses relatively slow, thereby it is impossible to synchronously update with the core modules; and since the current televisions are all in one machines, thereby it cannot separately upgrade the core modules. In order to enable consumers to enjoy the television brought by the latest technology with the lowest cost, the applicant invented the aforementioned audio and video system, so that users can upgrade the core modules like the video function and the hardware of the old TV via purchasing or upgrading the control block 10 having a new function, the newly upgraded control block 10 and the old display panel 11 are configured into a TV with the latest technology, therefore it allows users to enjoy the latest television technology with a lower cost.

As an embodiment, the control block 10 can be regarded as a dongle or a plug adapter, i.e., the control block 10 can be plugged into the display panel 11 through a plug-n-play connector or wires. For example, the plug-in TV (in the embodiment 1) configured based on the embodiment may comprise a TV panel and a plug card, and the plug card is plugged into the TV panel and will achieve a normal TV function once power on; while upgrading the plug-in TV, users can just upgrade the plug card or replace a new functional plug card to complete the upgrade of the entire plug-in TV; the display panel 11 is only used as a monitor, which does not need to be upgraded or replaced, thereby allows users to enjoy the most advanced television technology with very low upgrade cost, and also effectively promotes the rapid development of television technology.

Wherein, in the plug-in TV, the display panel is as the main structure of the volume of the TV, which is provided with slots, the plug card is smaller compared to the volume of the display panel; meanwhile the integration process integrates a plurality of core devices into a whole plug card having plugs matching the slots, the plug card is plugged into the slot through the plug, so that the assembling of the television can be easily completed; accordingly, the plug card can share the power supply configured in the display panel according to demands.

Meanwhile, the plug-in TV is based on the embodiment 1, while achieving personalized assembling and separate upgrading of various integrated units, the display panel is used as the main structure of the TV, and the connection between the display panel and the control block can be achieved through sockets; i.e., users can easily replace and upgrade the control block by a pluggable way, thereby reducing upgrade and maintenance costs, and also reducing the upgrade difficulty of users.

Further, as another embodiment, the control block 10 may also be regarded as a control box, and the control box has an output in HDMI or other format, so that the output of the control block 10 may be connected to the input in the display panel 11 in a matching format with the output, i.e., the control block 10 may use the HDMI output to connect to the HDMI input in the display panel 11 through the HDMI cable (of course, other types of cable can be used to achieve the communication and/or electrical connection between the control block 10 and the display panel 11; correspondingly, the control block 10 and the display panel 11 should be provided with connection ports matching the specification of the cable, i.e., the specification or type of the cable will not affect the implementation of the technical solutions of the present application, as long as completing the communication and/or electrical connection between the control block 10 and the display panel 11). For example, the box controlled TV constructed based on the embodiment is provided with a plurality of separate modular structures, such as a control box and a TV panel, and the TV panel is connected to the control box through customized cables, and also each module can be upgraded separately, thereby it is convenient for upgrading or replacing the sub-systems of the television like the audio and so on.

Wherein, based on FIGS. 1-3, referring to FIG. 4, the hardware 102 of the control block 10 of the box controlled TV also comprises a power adapter 1021; the power adapter 1021 outputs an electrical signal D (the power adapter 1021 can also be configured in the screen terminal device like the TV panel according to specific needs, as long as it can achieve the purpose of sharing the same power supply), to power the TV panel through a connector; i.e., the control block and the TV panel share the same power supply, so that they no longer need to be provided with power lines separately, therefore the production cost of the TV is reduced, and also the space occupied by the TV is saved, and the structure is simple and beautiful.

Meanwhile, the box controlled TV may also be based on the embodiment 1, while achieving the personalized assembling and separate upgrade of various integrated units, the control box is used as the main structure of the television, and the control box powers the TV panel through cables, thus the upgrade and maintenance costs is reduced and the size of the TV panel is effectively reduced, so that the box controlled TV will have a nice light-weight performance.

It should be noticed that in the plug-in TV and the box controlled TV, the displays used are basically the same, and the difference lies on corresponding changes of the package pins of the connection port based on the different PCB board layout, which can be achieved interoperability between each other. In addition, between the plug card and the control box, the same main chip can be used to support video decoder and multimedia functions.

Embodiment 3

Based on the embodiments 1 and/or 2, the present application also provides an audio and video interface conversion device used in television systems like the plug-in TV, separating TV and the box controlled TV, i.e., the audio and video interface conversion device may be applied to the display panel of the embodiment 1 and the TV panel of the embodiment 2; however, connection modes between the control block and the display of different types of TV are different, so that in the practical application, the audio and video interface conversion device can be adaptively adjusted based on the actual situation, while the main principle and structure thereof are applicable to each other.

The audio and video interface conversion device of the present embodiment may be a bridge IC (bridge chip); for example, a high-performance single-chip may be provided as the bridge IC, as long as it can convert the HDMI format data into the LVDS and/or V-by-One format data; for example, the bridge IC may have an embedded 32 bit RISC processor for system control, and be integrated with an embedded HDMI receiver and a LVDS/V-by-One transmitter, i.e., the bridge IC supports HDMI 2.0 input, and converts the input data into the LVDS/V-by-One format data to output; the embedded HDMI receiver fully supports the HDMI 2.0 specification, and receives audio and video signals through the input of the display panel.

Preferably, the HDMI 2.0 interface in the bridge IC can be extended, so that the bridge IC can support the resolution, for example, higher than 4K×2K×8 bit 4:4:4 60 Hz; thus the bridge IC may have a more matching resolution (like the 4K×2K×10 bit 4:4:4 60 Hz resolution etc.) with the native resolution of the screen terminal, so that to achieve the best image quality. Preferably, the above mentioned bridge IC further comprises a video processing unit and an audio processing unit, and the video processing unit can not only perform advanced image correction and enhancements, but also can convert the format of the processed data into the LVDS/V-by-One format to output.

Preferably, the bridge IC is further integrated with a LVDS transmitter and a V-by-One transmitter; the LVDS transmitter transmits data with the resolution lower than 1080P@60 fps, and supports single-link and double-link. LVDS output, and the V-by-One transmitter supports the data output with 2K/4K@60 fps resolution.

Preferably, the bridge IC of the embodiment is further integrated with many advanced peripherals, such as an IR remote receiver, a 2-channel ADC device, a I2C device, an UART device, a SPI device, a. PWM interface and so on.

Further, the bridge IC is further integrated with an on-chip oscillator and a 64 KB SRAM to effectively reduce system complexity and BOM cost.

In the present embodiment, the bridge IC is high performance and cost-effective, and has the function of converting the received HDMI data into LVDS/V-by-One format data, so that it can be applied in HD, FHD, URD and other devices.

Figure 5:
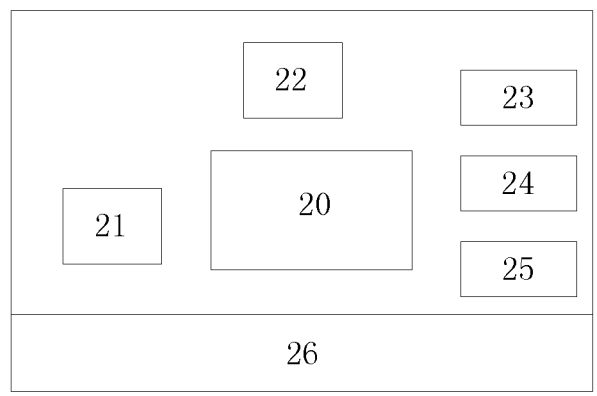
FIG. 5 is a structure diagram of the bridge IC in the audio and video interface conversion device in the embodiment 3 of the present application.

FIG. 5 is a structure diagram of the bridge IC in the audio and video interface conversion device in the embodiment 3 of the present application; as shown in FIG. 5, the bridge IC comprises a core and fabric module 20, an audio/video input unit 21, a video output unit 22, an audio output unit 23, a memory interface 24, a system interface 25, and an input/output unit 26.

Further, the core and fabric module 20 may comprise a plurality sub-systems such as an embedded 32-bit RISC processor, and also comprise video processing units, storage units for independently storing data (such as a 64 KB SRAM) and ICCM, DCCM and other units, and the core and fabric module 20 also supports the fast computation and extended arithmetic package of MAC operation.

Preferably, the above mentioned video processing unit has a pattern generator, an OSD, a DNLP, a white balance, a Gamma, a Hue saturation adjust, a bight contrast and other functional modules, and the pattern generator can generate gray scale colored light of a variety of standard like red, green, blue, white and black.

Preferably, the audio/video input unit 21 has an embedded HDMI 2.0 Rx interface for receiving HDMI format television signals, and the supported resolution of the audio/video input unit 21 is 1080P@60 Hz, 1080P@120 Hz, 1080P@50 Hz, 1080P@100 Hz, 1366*768@50 Hz, 1366*768@60 Hz or 4K*2K@60 Hz, etc.; accordingly, the video output unit 22 has a LVDS port and a V-by-One port, the LVDS port is a 1-channel or 2-channel and supports the resolution of 1080P@60 Hz, 1080P@50 Hz, 1080P@100 Hz, 1366*768@50 Hz or 1366*768@60 Hz, etc., while the V-by-One port supports the resolution of 1080P@60 Hz, 1080P@120 Hz, 1080P@50 Hz, 1080P@100 Hz, 1366*768@50 Hz, 1366*768@60 Hz or 4K*2K@60 Hz and so on.

Preferably, the audio output unit 23 has a 2-channel 12S port, the memory interface 24 has a SPR NOR and a flash controller, and supports 1-bit, 2-bit or 4-bit flash through the SPI interface; the system interface 25 has PLLs, an internal OSC and a PMU, etc., the input/output unit 26 has an IR remote, two embedded SA RADC sub ports, two 12C sub ports, three UART sub ports, a SPI sub port, four PWM sub ports and a set of common I/O interfaces. Wherein in the four PWM sub ports, one of PWM sub port is used for LED output, the remaining three PWM sub ports are used for video output.

Further, the above mentioned bridge IC is also integrated with peripheral devices like input ports for common counters, timers, internal oscillators and 24 MHz crystal oscillators, and the bridge IC further has two internal power management modules controlled by software and so on.

Preferably, the audio and video interface conversion device of the present embodiment can be configured with pins of specification of 13*13 for port connection, specifically each pin can be adaptively configured in accordance with the actual needs based on existing standards, and part of the pins can be configured as all-purpose pins, so as to be adapted to televisions assembled in different ways.

In summary, the present application separately configures the display and the plug card, and a plurality of function modules in the plug card are integrated as a whole, so that the plug card and/or any of the function modules can be separately replaced or upgraded, thereby each function module in the whole television structure can be separately upgraded or replaced, to effectively solve the problem of the upgrading mismatch between the components in the television structure, and reduce the upgrade and maintenance cost of the television; and the plug-in television described in the application can easily and timely upgrade the entire television with a low cost only by replacing or upgrading the plug card, thus it makes users enjoy the most advanced television technology with the lowest cost.

While the present disclosure has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A plug-in television, comprising:
a display, configured with a slot;
a plug card, plugged into the slot to connect to the display;
wherein the plug card is connect to a signal transmission device of the plug-in television through the display to receive first data transmitted through the signal transmission device, and, after processing the first data, to convert the processed first data into second data;
the display receives the second data, and plays audio and video signals contained in the second data;
wherein the first data is a HDMI format data and the second data is a low-voltage differentiating signal (LVDS) data;
the plug card comprises:
at least one subunit, and each of the subunits being connected to a matching signal transmission device;
a core unit, and each of the subunits being connected to the display through the core unit; wherein any one of the subunits receives the first data from the matching signal transmission device, and converts the first data into unprocessed data in a standard format to the core unit, and the core unit processes and converts the unprocessed data in the standard format into the second data, each of the subunits and the core unit is separately integrated into a single structure, configured to be separately upgraded and replaced; each subunit realizes a processing function for data in at least one format, the data can be wireless television data or closed circuit television data or internet signals; and the core unit comprises a master control chip, the plug card is allowed to be assembled by the subunit and the core unit;
the subunits comprise:
a wireless television signal processing subunit, configured to receive and process wireless television signal transmitted through wireless broadcasting, and to convert a format of the wireless television signal into the standard format;
a closed circuit television signal processing subunit, configured to receive and process closed circuit television signal transmitted through wire transmission, and to convert a format of the closed circuit television signal into the standard format;
an internet television signal processing subunit, configured to receive and process internet television signal transmitted through Internet, and converting a format of the internet television signal into the standard format;
the plug card further comprises:
a local storage device, connected to the core unit;
wherein the core unit can call and transmit the audio and video data stored in the local storage device to the display for playing;
the subunits further comprise:
a wireless communication device, configured to receive and transmit network audio and video data to the core unit for processing, and the core unit transmits the processed network audio and video data to the display for playing;
the audio and video signal comprise audio data and/or video data;
the display comprises: a bridge chip, receiving the second data and, after processing the second data, outputting the audio data and/or the video data for playing;
the display further comprises: a plurality of peripheral devices, connected to the bridge chip to adjust operating parameters of the audio device and the display device, and receive remote-control signals transmitted through a remote control matching the plug-in television.

2. The plug-in television according to claim 1, wherein the display further comprises: a display device, connected to the bridge chip to receive and play the video data; a power adapter, connected to the plug card to drive the plug card.

3. The plug-in television according to claim 2, wherein the display further comprises: an audio device, connected to the bridge chip to receive and play the audio data.

4. The plug-in television according to claim 1, wherein the plurality of peripheral devices comprise: physical buttons, connected to the bridge chip to adjust the operating parameters of the audio device and the display device; a remote-control signal receiving device, connected to the bridge chip to receive the remote-control signals, so as to control the playing of the audio data and/or the video data.

5. The plug-in television according to claim 1, wherein the subunits further comprise: an audio and video input device, configured to receive audio and video data transmitted through an external audio and video output device, and, after processing the audio and video data, transmitting the processed audio and video data to the display.

6. The plug-in television according to claim 5, wherein the audio and video input device stores the processed audio and video data into the local storage device.

7. The plug-in television according to claim 1, wherein the display exchanges data with the plug card via preset plug pins.

* * * * *